United States Patent [19]

Staub et al.

[11] 4,115,929
[45] Sep. 26, 1978

[54] GAS DISTRIBUTOR FOR FLUIDIZING BEDS

[75] Inventors: Fred W. Staub; Peter A. Morgan, both of Schenectady, N.Y.

[73] Assignee: Electric Power Research Institute, Inc., Palo Alto, Calif.

[21] Appl. No.: 735,930

[22] Filed: Oct. 27, 1976

[51] Int. Cl.² .............................................. F26B 3/08
[52] U.S. Cl. ...................................... 34/10; 34/57 A; 34/57 B
[58] Field of Search ................... 34/57 A, 57 B, 57 R; 110/28 J; 432/15, 58

[56] References Cited

U.S. PATENT DOCUMENTS 2,656,007  10/1953  Arnold et al. ........................ 34/170
3,721,017   3/1973  Niems ................................... 34/170

Primary Examiner—John J. Camby
Assistant Examiner—Larry I. Schwartz
Attorney, Agent, or Firm—Townsend and Townsend

[57] ABSTRACT

A plate-type gas distributor for fluidizing a bed of particulate matter is described for use in elevated superficial velocity applications. The distributor comprises an assembly of plates or sheets formed into troughs and into deflector baffles which overlie the edge of adjacent troughs to form modules arranged in longitudinal rows. The troughs and the baffles are spaced in a predetermined manner by joining struts or ribs. A circuitous gas flow path is defined by the slit between each deflector baffle and adjacent troughs. The minimum spacing between adjacent troughs is chosen so that the fluid flow velocity through the trough spacing at design point is equal to or greater than the terminal velocity of the fluidized particles.

5 Claims, 4 Drawing Figures

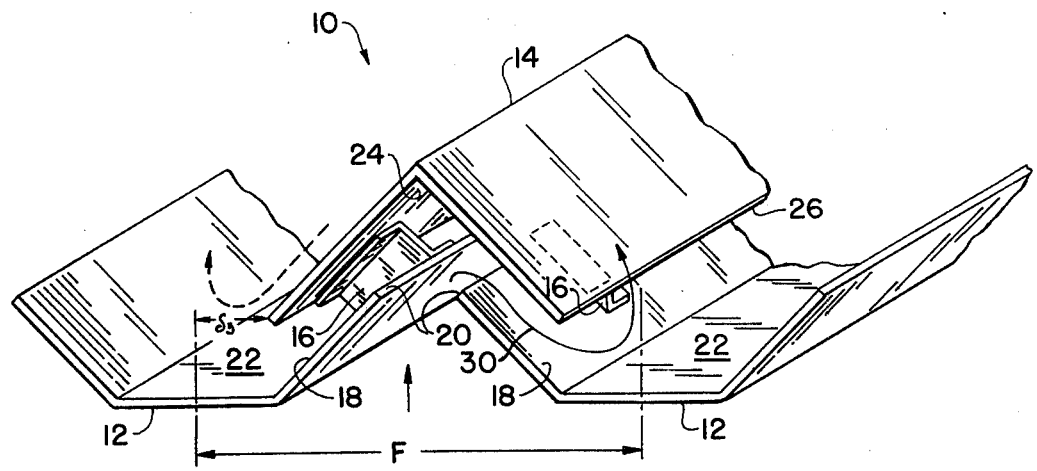
FIG._1.
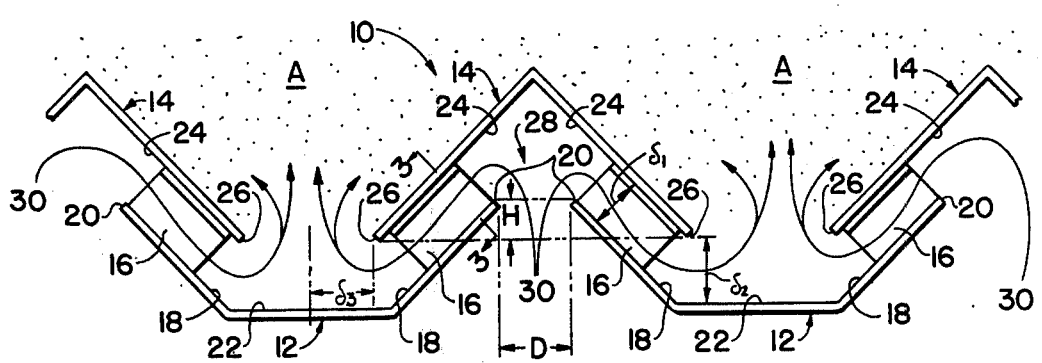
FIG._2.
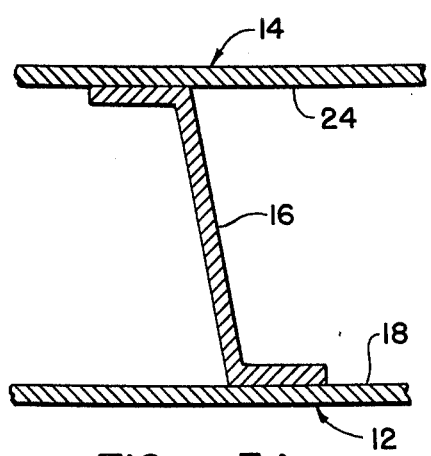
FIG._3A.
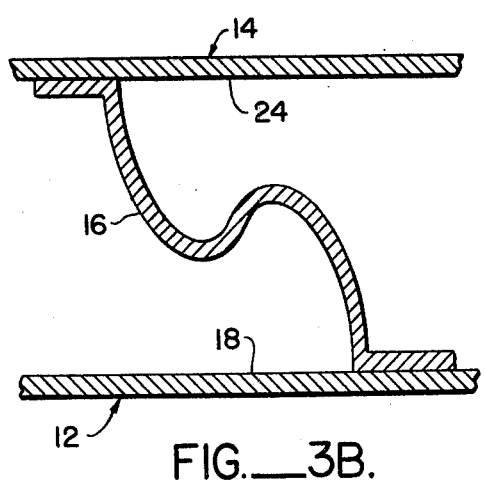
FIG._3B.

GAS DISTRIBUTOR FOR FLUIDIZING BEDS

This invention was made under contract with or supported by the Electric Power Research Institute, Inc.

BACKGROUND OF THE INVENTION

1. Field of the Invention

This invention relates to plate-type bed fluidized distributor structures and particularly to a fluidized bed distributor employing a modular supporting plate and baffle particularly useful in high superficial velocity applications.

Fluidization is a technique for rendering particulate matter into a suspension fluid by introduction of gas flow through the bed of matter. Particulate fluidization finds use in fossil fuel combustion furnaces as well as in the drying and curing of various materials such as cement, to name one example.

At high superficial velocities of the fluidizing fluid, e.g., at about 7 m/s (25 ft/s) near atmospheric pressure or at about 2.5 m/s (8 ft/s) at elevated pressures of about 10 atm, it is difficult to achieve particle retention and, at the same time, to maintain a low pressure drop across the fluidizing distributor. In particular, at high superficial velocities, conventional distributors will cause a pressure drop greater than 4.7 cm Hg (25 in $H_2O$) with a high probability of component erosion or with loss of fluidized particles through the distributor structure during turn-down.

2. Description of the Prior Art

Bubble cap or tuyere type fluidized bed distributors have the well known ability to minimize particle loss. Such distributors are unfortunately unsuited to applications utilizing high superficial gas velocities because of undesirably high pressure loss therethrough. Moreover, in elevated temperature environments, such distributors are prone to hot spot formation where lack of adequate gas circulation results in inadequate surface cooling.

Plate-type distributor designs of the prior art are documented in the literature. For example, J. F. Davidson et al., *Fluidization*, (Academic Press, 1971), describes plate-type distributors utilizing overlying baffles to reduce erosion, and it further describes distributor structures having gas flow patterns for minimizing particle loss. Davidson, et al. also describes realtively simple sieve-like perforate plate distributor structures which can be easily and inexpensively constructed. One known invention is described in Black et al., "Improved Air Distributor for Fluidized Beds", *Chemical Engineering Progress*, Volume 62, No. 3 (March 1966) page 82, which shows a distributor comprising orifices in a bottom plate having cones covering the orifices. The Black device likewise suffers from inadequate gas flow capacity and is susceptible to particle loss on turn-down.

In general, the known prior art distributor structures suffer from the shortcomings of high component erosion probability, susceptibility to hot spot formation and poor particle retention. Component erosion is caused by the collision of the fluidized particles against the surface of the distributor and its related parts which can ultimately destroy the components. Poor particle retention is the loss of particles through the distributor bed during turn-down or as a result of flow backwash of the fluidized bed or settling of the static bed. Hot spots, which are a particular problem in heated bed applications, may be caused by eddies or circulation dead spots near the surface of the distributor and related components, resulting in undesired localized heating and possible damage to structure.

A fluidized bed distrbutor is therefore needed which operates satisfactorily at high superficial velocities without the above enumerated shortcomings.

SUMMARY OF THE INVENTION

A gas distributor for fluidizing a bed of particulate matter comprises an assembly of plates or sheets formed into troughs and into deflector baffles overlying the margins of adjacent troughs and arranged in longitudinal rows. The troughs and the baffles are spaced in a predetermined manner by struts or ribs, which are preferably flexible in the longitudinal direction to accommodate thermal stress. The spacing relationship defining the gas inlet and gas flow path of the troughs minimizes pressure drop across the distributor and trough the bed fluidized at selected high superficial velocities while inhibiting undesired loss of particles, component erosion and hot spot formation.

In addition, in the preferred embodiment, the space between adjacent baffle side margins defining the gas outlet into the fluidized bed is not less than the space between the edges of the adjacent trough walls defining the gas inlet, while the opening size between facing surfaces of the baffles and of the trough does not exceed the space between the edges of adjacent trough wall. Further, the top sides of the baffles are preferably peaked or sloped so that loose material cannot readily accumulate thereon.

In addition, the supporting ribs in the preferred embodiment are relatively thin flexible sheet metal plates mounted laterally, generally parallel to the streamline between the facing surfaces of the trough and the baffle. The ribs may be obliquely mounted between the confronting trough and the baffles surfaces, or they may be thin convoluted or folded sheets in a configuration suitable to absorb the flexure caused by thermal expansion.

The size and relationship of dimensions between the trough and baffle, as well as the overlap dimension, are selected to minimize the pressure drop of a high superficial velocity gas fluidizing the bed of particulate matter supported above the distributor, while at the same time preventing particle backflow and component erosion. Moreover, the circuitous circulation path defined by the baffle and trough configuration inhibits potential hot spot formation in elevated temperature environments.

It is an object of the present invention to provide a fluidized bed distributor which minimizes pressure drop thereacross at high superficial gas velocities, while maintaining good particle retention, low component erosion probability and maximum resistance to hot spot formation.

It is a further object of this invention to provide a gas distributor structure capable of accommodating substantial thermal stress.

It is a still further object to provide a gas distributor structure maximizing the area for gas passage therethrough.

It is a still further object of the invention to provide a distributor structure which is easily modularized.

BRIEF DESCRIPTION OF THE DRAWINGS

The invention will be best understood by reference to the following description taken in conjunction with the accompanying drawings, in which:

FIG. 1 is a perspective view of a section of a fluidized bed distributor structure according to the invention;

FIG. 2 is an end elevation view;

FIG. 3A is a cross-sectional view along line 3—3 of FIG. 1 showing a first alternative embodiment of a supporting rib; and FIG. 3B is a cross-sectional view as would be viewed along 3—3 of a second alternative embodiment of a supporting rib.

DETAILED DESCRIPTION OF PREFERRED EMBODIMENTS

A fluidized bed distributor 10 is shown in FIG. 1 and in FIG. 2. The distributor 10 comprises a plurality of troughs 12, deflecting baffles 14 and supporting struts or ribs 16, joining the baffles 14 to the troughs 12.

Each trough 12 comprises an elongated plate or sheet folded longitudinally to form outwardly angled longitudinal side walls 18 with raised edges 20 and a generally flat floor 22. The width of the floor 22 and the side walls 18, as well as the height of the edges 20 above the floor 22 and the angle of the side walls 18, are selected to conform with the lateral and vertical dimensions of the deflecting baffles 14.

Each deflecting baffle 14 is preferably fabricated of a sheet or plate folded longitudinally in a V-shaped pair of outwardly spread panels 24, each panel 24 having a side margin 26. The V-shaped baffle 14 has the advantage of easy fabrication, as well as relatively steep slope to the panels 24. However, the baffle 24 may as easily be formed in a crown or arcuate shape attaining a substantially equivalent function.

The troughs 12 are disposed in a side-by-side planar grid with the edges 20 spaced from one another by a preselected distance D, which defines a longitudinal slot or orifice 28, as shown in FIG. 2. Each baffle 14 is mounted to adjacent troughs 12 by ribs 16 so that the baffle 14 covers trough edges 20 and overlaps trough side walls 18. The baffle side margins 26 are preferably offset below the trough edges 20 by a preselected distance H. One trough 12 and one baffle 14 together may be referred to as a distributor module. Distributor modules are assembled into arrays or grids and mounted on a frame (not shown) which supports the distributor 10 and an overlying bed A (FIG. 2).

The invention is operative as follows:

Gas, usually air, is introduced from a plenum below the distributor 10, supporting a bed A of particulate material. The gas is directed through the slot orifice 28 at high velocity and is deflected by the baffles 14 into the bed A, as indicated by arrows 30 in FIG. 2. The velocity of gas through the orifice 28 is selected to be greater than the terminal velocity of the particles in the bed A. As a result, the particles are not lost through the orifice 28 due to backwash during normal gas flow. Indeed, the structure of the distributor 10 causes particles to be swept away from the orifices 28 rather than into it. Moreover, because the area of the slot-type orifice 28 is so great as compared to the total surface of the distributor 10, especially as compared to the aperture-type orifice, pressure drop across the distributor 10 is minimized at elevated gas velocities.

The arrangement of slot orifices 28 in parallel rows and the profile of the trough walls 18 have still further advantages. For example, flow pattern dead spots along the surface of the distributor 10 where overheating might occur are substantially eliminated. The present distributor configuration is also found to reduce the probability of the distributor component erosion, which is known to be particular troublesome in the bubble cap or tuyere-type configurations.

The distributor 10 also exhibits excellent particle retention characteristics under static conditions. At the end of a gas flow operation, for instance, the particles in bed A settle over the baffle 14 and onto the floor 22 of trough 12. Some lateral slippage of bed A occurs during settling. However, particles are prevented from spilling back through the orifice 28 by a trap formed by the vertical overhang H of the baffle panels 24.

The orifice 28 defined by separation D is generally the smallest area in the gas flow path, and as such determines the principle retention characteristics of the distributor. The separation D is selected so that the gas flow at the design velocity through the orifice 28 does not result in particle loss. The design velocity is generally in the range of the terminal velocity of the mean size of the particles desired to be retained above the distributor 10 in bed A. The exact dimension of the separation D is dependent upon many factors. For instance, the particle terminal velocity is dependent upon the size, density and character of the typical particle, and by the density of the gas. The density of the gas is dependent upon the ambient temperature and pressure of the gas, and the velocity of the gas through the orifice 28 is a function of the gas pressure differential across the orifice 28, which is a function of the orifice size and the bed back pressure. The relationship among these factors affecting terminal velocity are sufficiently understood that a designer of ordinary skill could select suitable dimensions for the distributor 10 under the chosen operating conditions.

Nevertheless, other criteria may outweigh the criteria of absolute particle retention. For example, under some conditions it may be desirable to permit selected sizes or densities of particles to fall through the orifice 28 while retaining other particles in the bed above the distributor 10. Under such conditions a different orifice velocity may be selected.

A further critical dimension is the height H defining the overhang of trough edges 20 and baffles margins 26. The height H defines a trap, as above explained, to prevent backwash of particles particularly during settling of the static bed. Specifically, the height H should generally be greater than zero.

By way of example, for a mean granule size of about 0.1 mm (0.03 in) a height H of about 3 mm (⅛ in) is found to be sufficient.

Since the orifice 28 is longitudinal, dimensions other than the separation D and the height H are less critical, so long as the size of the outlet areas do not result in the creation of back pressure greater than the pressure drop across the orifice 28. For example, the minimum spacing between the panels 24 and the walls 18, $\delta_1$, between the baffle margins 26 and trough floor 22, $\delta_2$, and between adjacent baffle margins 26, $2\delta_3$, are typically chosen so that total outlet cross sectional area is greater than the area of orifice 28 defined by separation D. Some flexibility is permitted in the spacing between baffle panels 24 and trough walls 18 $\delta_1$. The object is however to maximize the three dimensions $\delta_1$, $\delta_2$, and $\delta_3$ without exceeding the lateral dimension F of the distributor module with the ultimate object to minimize pressure drop across the distributor 10 at high superficial velocities.

Referring now to FIG. 3A, there is shown a first preferred embodiment for a rib 16. The rib 16 may be a piece of sheet metal straight except for a flange at each end which is bonded to the trough 12 and baffle 14. The rib 16 is aligned in the streamline of the flow path and mounted at an oblique angle between trough wall 18 and baffle panel 24. The oblique angle permits the strut to accommodate the flexure characteristics of the distributor 10 by allowing for expansion and contraction of the baffle 14 and trough 12, particularly in the longitudinal direction, along which the stress of thermal effects may be expected to be greatest.

FIG. 3B illustrates one alternative embodiment of rib 16, in which a convolute sheet is mounted in the streamline between trough 12 and baffle 14. In particular, the rib 16 of FIG. 3A is a sheet forming an S in cross section. This configuration allows for even greater lateral expansion than the rib of FIG. 3A.

Still other embodiments of the present invention will be suggested to the mechanic of ordinary skill by this description. As one example, folded ribs might also be employed in substitution for straight or convoluted ribs.

The entire structure taken as a whole provides a fluidized bed distributor which permits high superficial gas velocities with minimal pressure drop, while also minimizing particle loss, component erosion probability and hot spot formation. Therefore, it is not intended that the invention be limited,, except as defined by the appended claims.

We claim:

1. A gas flow distributor for fluidizing a bed of particulate material, said distributor comprising:

a plurality of base plates defining longitudinal troughs with raised side walls and arranged in longitudinal rows to form at least one slot orifice of pre-selected size between the edges of adjacent side walls;

at least one deflector baffle forming a covering over said at least one orifice and said trough side wall edges;

spacing means for separating said plates and said at least one baffle, wherein said spacing means comprises at least one flexible rib supportably joining facing surfaces of said base plates and said at least one baffle and for accommodating expansion and contraction of said plates and said at least one baffle for establishing a circuitous fluid flow path between a plenum below the distributor and the bed above the distributor.

2. A fluidized bed distributor comprising;

an array of plates, each forming a generally straight longitudinal trough, and each plate having raised, outwardly slanting side walls, the edges of sidewalls of adjacent troughs being separated a preselected distance to define a slot for the upward induction of a fluidizing gas;

an array of deflector plates, each plate forming generally straight longitudinal screens having a crowned cross-section and each disposed overlie said slot and to vertically overlap said side walls to define a circuitous fluid flow path;

spacer means, said spacer means comprising at least one straight flat flexible sheet attached at each end at an oblique angle to facing surfaces of said baffle and said trough, said sheet being aligned in the streamline of gas flow for maintaining at least a pre-selected separation between said baffle and said trough side walls.

3. A fluidized bed distributor comprising;

an array of plates, each plate forming a generally straight longitudinal trough, and each plate having raised, outwardly slanting side walls, the edges of side walls of adjacent troughs being separated a pre-selected distance to define a slot for the upward induction of a fluidizing gas;

an array of deflector baffles, each baffle forming a generally straight longitudinal screen having a crowned cross-section and each baffle being disposed to overlie said slot and to vertically overlap said side walls to define a circuitous fluid flow path; and spacer means, said spacer means comprising a convoluted flexible sheet attached at each end at an oblique angle to facing surfaces of said baffle and said trough, each sheet being aligned in the streamline of gas flow for maintaining at least a preselected separation between said baffle and said trough side walls.

4. A method for fluidizing a bed of particulate material comprising the steps of:

a. supporting said bed on a perforate floor such that downflow of particulate material is minimized during fluidization and non-fluidization, said floor comprising a plurality of longitudinally extended base plates and baffles, said base plates having raised lateral edges and being disposed in a generally horizontal pattern in side by side relationship defining a plurality of longitudinally extended gas inlets therebetween, said baffles having a cental crown and lowered lateral margins for preventing accumulation of the particulate materials upon said baffles, said baffles being substantially fixed relative to each base plate and covering said inlets and vertically overlapping said lateral edges to inhibit gravity flow of the particulate material down through said inlets, said baffle lateral margins defining a plurality of generally longitudinally extended gas outlets therebetween and laterally offset from said inlets, the underside of said baffles and the overside of said base plates defining first and second generally longitudinally extended passageways between said inlets and said outlets;

b. generating a gas plenum below said floor having a higher pressure than the ambient pressure above said floor for urging a flow of gas up into said particulate bed; thereafter c. directing gas up through said inlets to impinge upon the underside of said baffle; thereafter d. diverting said flow of gas by means of said baffle undersides downwardly and laterally outwardly through said first and second passageways; thereafter e. directing said gas flow from said first and second passageways by means of the overside of said base plate to impinge and mix the flow of gas from opposing adjacent second and first passageways, respectively; and thereafter f. exhausting the gas thus mixed through said outlets out into said particulate bed for fluidizing said bed while preventing the downflow of particulate material into the plenum.

5. A method according to claim 4 wherein the step of directing gas flow up through said inlets further includes the step of maintaining the velocity of said gas flow greater than the approximate terminal volocity of said particulate material.

* * * * *